United States Patent [19]
Cocito

[11] Patent Number: 5,789,708
[45] Date of Patent: Aug. 4, 1998

[54] UNDERGROUND TUBULAR DUCTS FOR TELECOMMUNICATIONS NETWORKS

[75] Inventor: Giuseppe Cocito, Via Massimo d'Azeglio, Italy

[73] Assignee: Cselt-Centro Studi E Laboratori Telecommunicazioni S.P.A., Torino, Italy

[21] Appl. No.: 603,871

[22] Filed: Feb. 22, 1996

[30] Foreign Application Priority Data

Mar. 14, 1995 [IT] Italy ................... TO95A0189

[51] Int. Cl.[6] ........................................ H02G 9/06
[52] U.S. Cl. ........................................ 174/68.1
[58] Field of Search ................... 174/68.1, 68.3, 174/95, 97, 99 R; 138/121, 125, 155; 254/134.3 R, 134.3 F

[56] References Cited

U.S. PATENT DOCUMENTS 4,741,593  5/1988  Fochler ................... 385/134
5,154,869  10/1992  Bergmann et al. ................... 264/167

FOREIGN PATENT DOCUMENTS

| | | | |
|---|---|---|---|
| 0414514A2 | 8/1990 | European Pat. Off. | H02G 1/08 |
| 3529541 A | 2/1987 | Germany | H02G 9/06 |
| 4031783 A | 9/1992 | Germany | H02G 9/06 |
| 41 33 415 A1 | 4/1993 | Germany . | |
| 3233505 | 10/1991 | Japan . | |
| 4131803 | 5/1992 | Japan . | |

*Primary Examiner*—Kristine L. Kincaid
*Assistant Examiner*—Joseph Waks
*Attorney, Agent, or Firm*—Herbert Dubno

[57] ABSTRACT

A duct for housing cables for underground telecommunications networks has one or more tubular elements of a first plastic material, having helical ribs on their inner surface. The ribs may also be formed as inserts into the material of the tubular element.

6 Claims, 4 Drawing Sheets

UNDERGROUND TUBULAR DUCTS FOR TELECOMMUNICATIONS NETWORKS

SPECIFICATION FIELD OF THE INVENTION

The present invention relates to an improved tubular duct for the underground installation of cables for telecommunications networks.

BACKGROUND OF THE INVENTION

It is well known that, for the underground installation of telecommunications networks, the cables (be they optical fiber or copper cables) can be inserted into tubular ducts made of plastics (usually high density polyethylene), once the latter have been set up in the proper underground structure.

The most commonly used ducts are made up of a pipe, or of multiple pipes joined together (usually to form a ribbon), with circular cross sections and smooth inner surfaces. A drawback associated with these ducts is the high friction between the cable and the pipe. To reduce such friction, the use of ribbed ducts has been proposed. Such ducts have, on their inner surface, rectilinear ribs with a step-like cross-sectional profile. Ribbed ducts reduce friction and ease cable insertion if the cable diameter is close to the inner diameter of the pipe, as the contact surface area is effectively reduced. In the case of cables of lesser diameter, it is possible for the cable to get stuck between adjacent ribs, giving rise, as the cable is pulled along, to a much great friction than that which would be encountered in the case of smooth ducts. Thus a high risk exists of damaging both the coating of the cable and the pipe itself because of the heat developed.

SUMMARY OF THE INVENTION

According to the invention, a duct is instead provided in which the inner ribbing of the pipes is realized in such a way as to ease the insertion of the cables irrespective of the ratio between the cable and the pipe diameters.

The duct according to the invention comprises one or more pipes made of a first plastic material with ribbed inner surface. According to the invention the ribs of such surface are helical.

In this way, not only is the contact surface between cable and pipe reduced, but the risk for small diameter cables to become stuck is also eliminated.

According to a preferred feature of the invention, the ribs have a bell profile, thus eliminating the sharp corners of a step-shaped ribs, which can hinder the advance of the cable.

According to another characteristic, the ribs are made of a second plastic material, which is different from the first and presents a reduced friction coefficient with the cable coating.

Advantageously, moreover, the surface of the ribs, near the rib top, can be worked in such a way as to retain a lubricating substance, which is released when the cable slides along the ribs.

BRIEF DESCRIPTION OF THE DRAWING

The above and other objects, features, and advantages will become more readily apparent from the following description, reference being made to the accompanying drawing in which.

SPECIFIC DESCRIPTION

For the sake of simplicity, hereinafter reference will be made to a duct comprising a single pipe; the application to ducts with multiple pipes is immediate.

Figure 1:
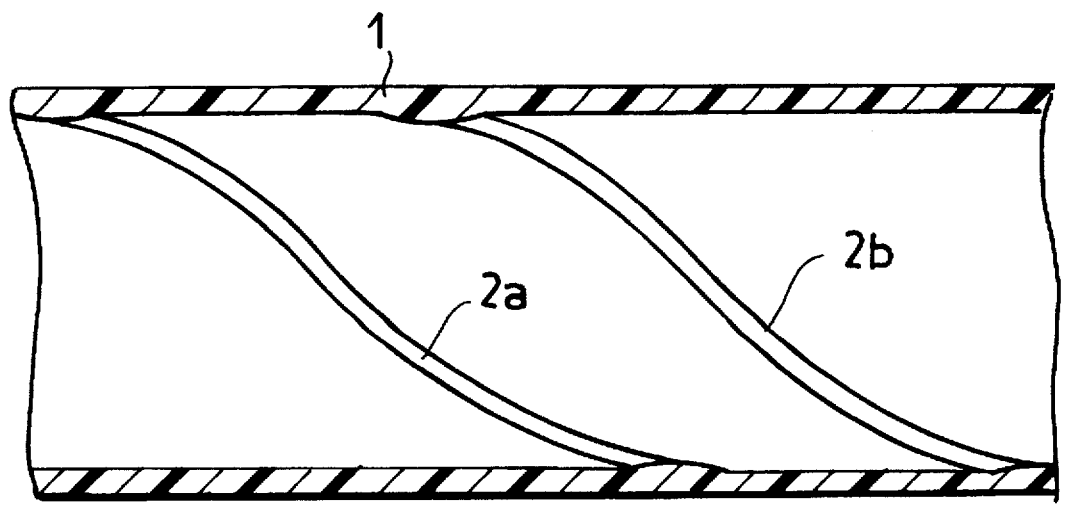
FIG. 1 is a longitudinal section of a portion of the inner surface of a pipe for use in underground ducts for telecommunications networks according to the invention.
Figure 2:
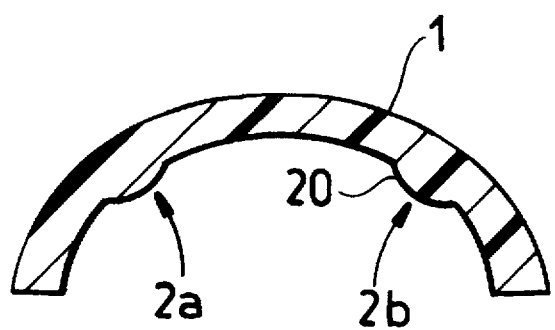
FIG. 2 is a partial cross sectional view of the pipe shown in FIG. 1.

FIG. 1 depicts a pipe 1 whose inner surface presents a series of helical ribs $2a$, $2b$ . . . , which preferably have a bell-shaped section, as can be seen in FIG. 2.

The presence of helical ribs not only reduces the contact surface between a cable and the pipe, but also allows the latter to be used without problems also for cables whose diameter is reduced with respect to the pipe diameter. The ribs prevent such cables from becoming stuck between adjacent ribs while being pulled, as can occur with rectilinear ribs. The bellshaped cross section of the ribs, moreover, hinders the advance of the pipe less than does the conventional step-shaped cross section.

Pipe 1 is made, like the conventional pipes, of a plastic material, like polyethylene (PE) or high density polyethylene (HDPE). Ribs 2 can be made of the same material as the pipe or of a different material, with a lower friction coefficient relative to he coating material of the cable. Obviously, in this latter case, it is important for the material of the ribs to be compatible with that of the pipe, to prevent the ribs from detaching from the inner surface of the pipe as a result of the thermal and/or mechanical stresses occurring during cable insertion. For example the ribs could be made of a polyethylene of which the density is different from, in particular higher than, that of the pipe. Polyethylenes of different densities are well compatible with each other. Other materials which are compatible with the polyethylene of the pipes are various fluorinated resins, with low friction coefficient and high softening point.

Compatibility between the materials of the ribs and of the pipe might also be obtained with relatively simple means, such as correction of the composition, separation of incompatible materials by a matching material, preparation of one of the surfaces through chemical or physical-chemical actions to make it wettable by the material of the other surface, etcetera.

Figure 3:
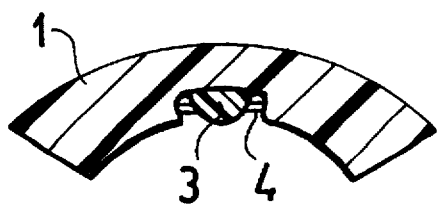
FIG. 3 is a view similar to FIG. 2, of another embodiment.

Alternatively, the ribs may be formed as inserts in the pipe walls, instead of being integral therewith. This solution is depicted in FIG. 3, where the insert ribs are indicated at 3. A suitable material to make the insert ribs is for instance polytetrafluoroethylene (PTFE). Insert ribs 3 can have the same bell-shaped cross section as ribs 2 in FIGS. 1, 2. In this case too, measures are to be taken to guarantee that ribs 3 and pipe 1 remain joined even in case of mechanical stresses or thermal variations. The ribs can, for change, be joined to the pipe surface by means of an adhesive 4, as shown in FIG. 3, or by means at irregularities in the surfaces destined to come into contact (e.g. roughness, sponginess, grooving, knurling, microholes or macro-holes etcetera) or by means of surface treatments, such as surface oxidation, bond breakage, addition of surface activating agents and so on.

Friction between the ribs and the cable obviously depends not only on the respective materials but also on the surface finish of the ribs. To make cable insertion even easier, ribs can be so worked, near and at the top, as to be able to retain a small amount of a lubricant which is slowly released on the cable as the latter advances in contact with the ribs. For example the top area can be made spongy, porous or rough, or it can have micro- or macro-grooves, or it can be associated with micro- or macro-tubules. By way of example, one of the ribs depicted in FIG. 2, e.g. rib 2b, shows top area 20 with surface roughness. This solution can be adopted both for ribs made of the same material as the pipe and for ribs made of different material and, in this latter case, also when the ribs are made as inserts.

FIGS. 4-7 show some examples of extruder nozzles, for example for screw extruders, suitable to fabricate the pipes described above. The part of the extruder that originates and provides the nozzle with the liquid material is not represented, as it is inconsequential to an understanding the fabrication of the pipes according to the invention.

Figure 4:
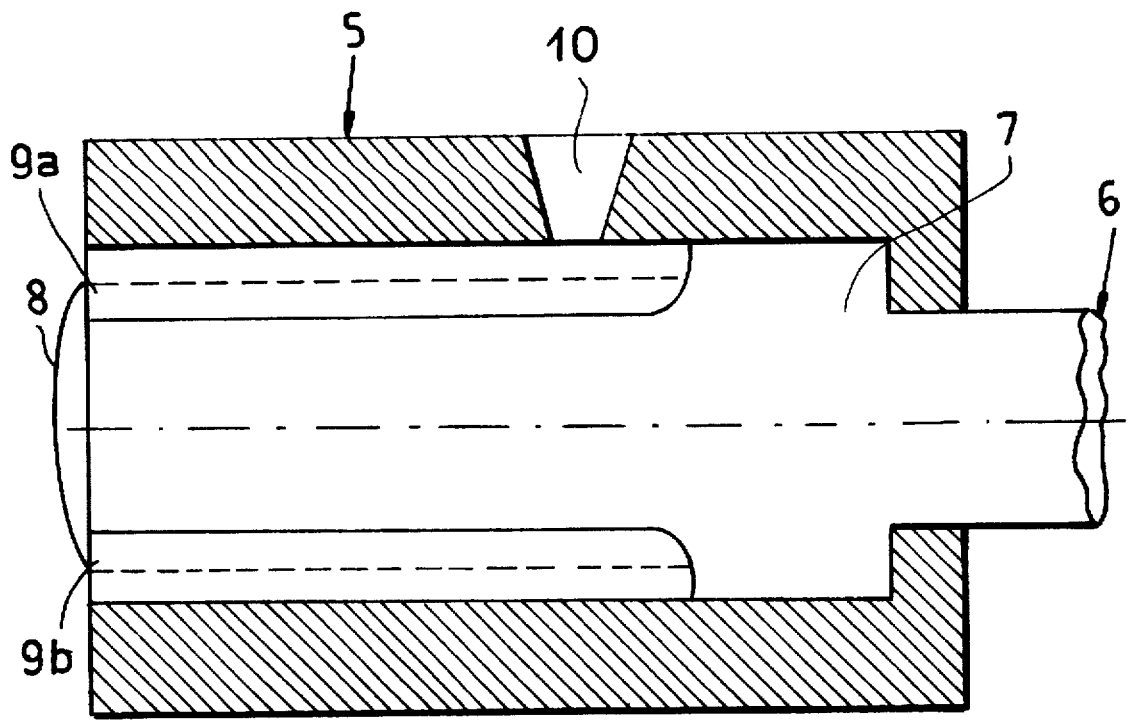
FIGS. 4, 5 are schematic views, respectively showing longitudinal and cross sections of the nozzle of an extruder which can be used to form the pipes shown in FIG. 2.
Figure 5:
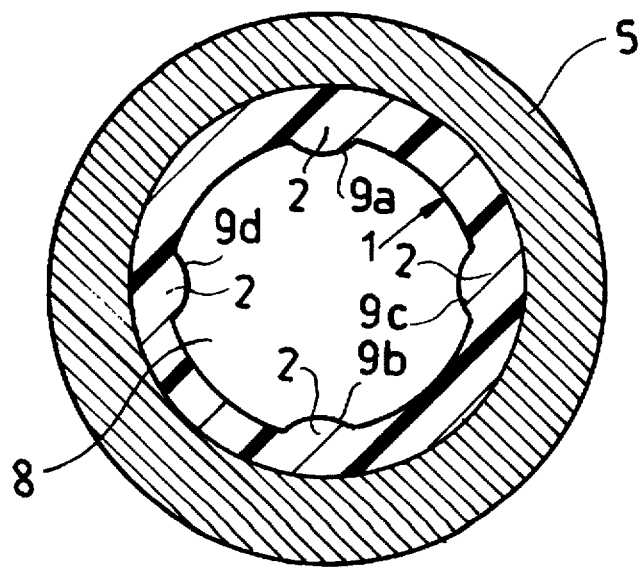

FIGS. 4 and 5 refer to the case in which pipes 1 and ribs 2 are made of the same material. The nozzle, indicated as a whole by reference 5, houses a rotating shaft 6 with a head 7 whose diameter essentially corresponds with the inner diameter of the nozzle, and a front body 8 whose surface presents longitudinal grooves 9a, 9b . . . , with cross-sectional profile corresponding to the one desired for the ribs. An opening 10 adjusts the liquid material into the chamber of the nozzle. It can be immediately seen that, as shaft 6 advances in the nozzle, the material deposited in grooves 9 will give rise to helical ribs 2a, 2b . . . shown in FIG. 1. To keep the drawing simple, the conventional means to impart the motion to the shaft, to cool the extruded material, etcetera, are not shown. It should be specified that shaft 6 shall have to be actuated by the same motor that actuates the screw of the extruder, so as to keep essentially constant the pitch of the rib helixes.

Figure 6:
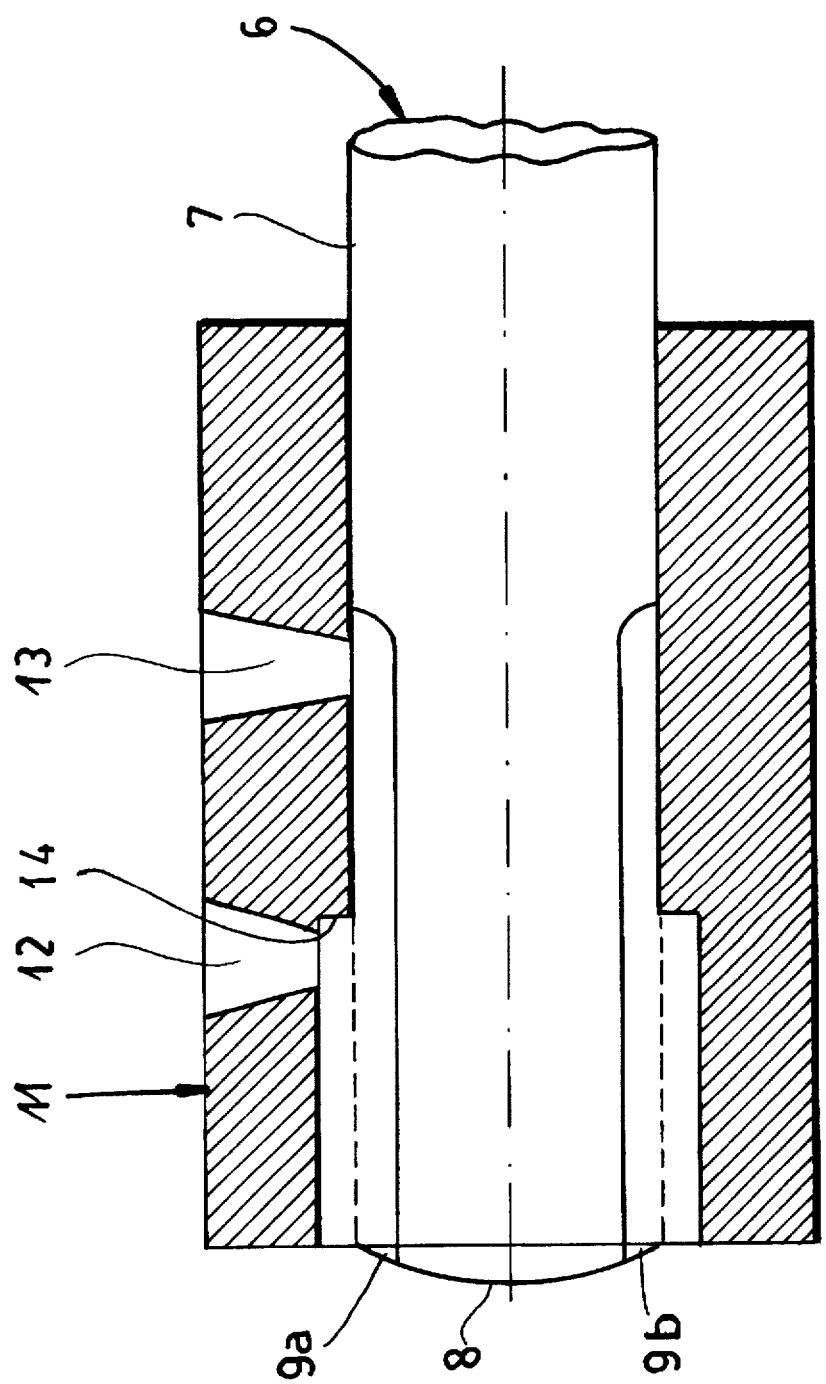
FIGS. 6, 7 are longitudinal sectional views of variant embodiments of the nozzle.

FIG. 6 shows a nozzle 11 suitable for use in the case in which ribs 2 are made of a different material from pipe 1 but are integral with the inner walls of the latter. The grooved shaft is indicated with the same reference as in FIG. 4. Nozzle 11 presents a front inlet 12 and a rear inlet 13 for the introduction of the materials of pipe 1 and of ribs 2, respectively, provided by distinct supply screws. An inner projection 14 of the nozzle chamber, placed immediately behind the front inlet 12, divides the chamber into two parts having different diameters: the rear part has an inner diameter corresponding to the outer diameter of grooved body 8 whilst the front part has a larger diameter to allow pipe 1 to be formed.

Figure 7:
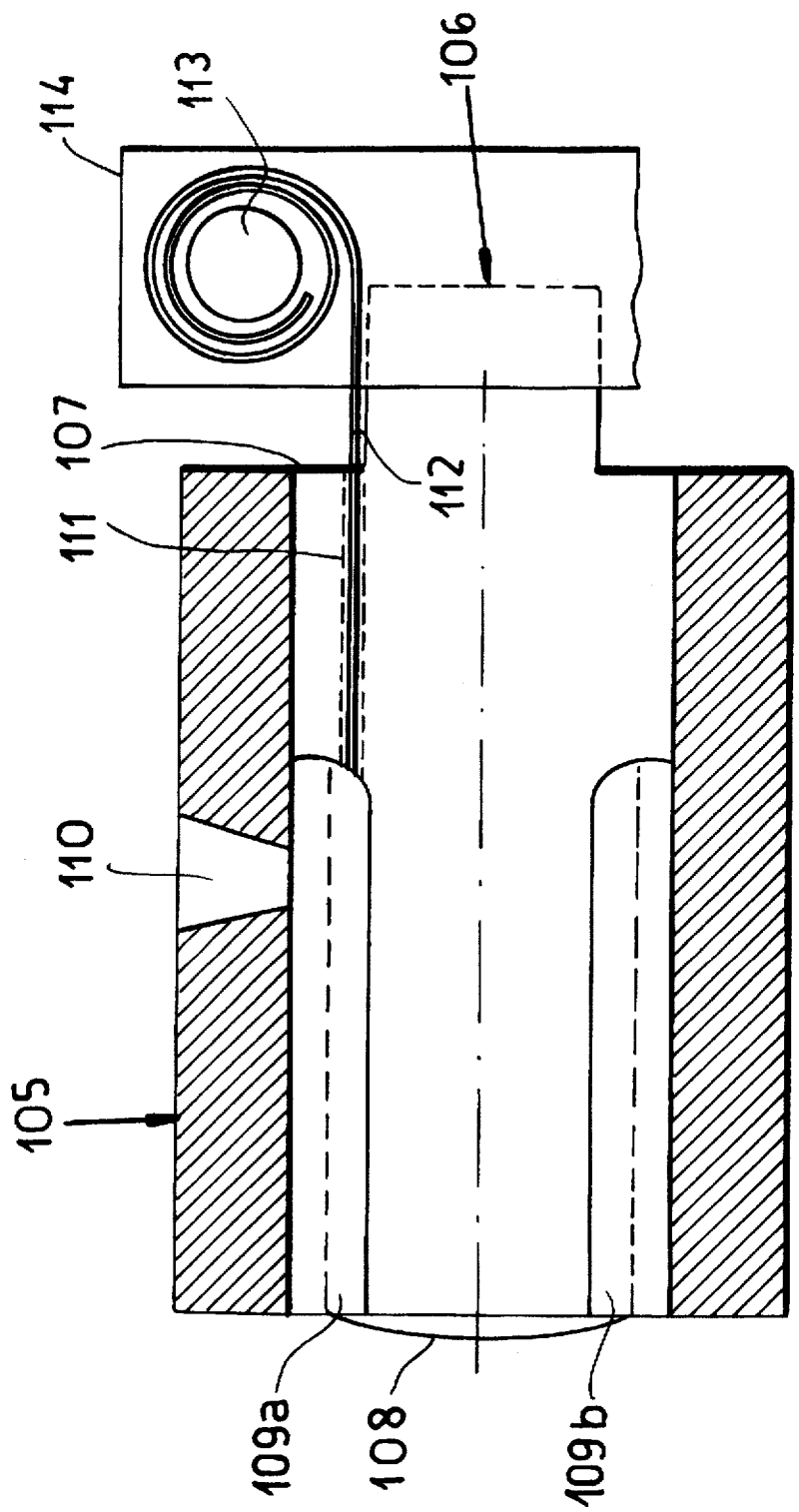

Finally, FIG. 7 depicts the case in which polytetrafluoroethylene inserts 3 are formed. The body of the nozzle, indicated as a whole by reference 105, is essentially identical to that of nozzle 5 in FIG. 4, with a single inlet 110 for the liquid material intended to form pipe 1. Shaft 106 still has a head 107 and a body 108 with grooves 109a, 109b. In correspondence with the head, grooves 109a, 109b communicate with ducts 111 realized in the head and intended to allow the passage of a polytetrafluoroethylene ribbon 112, drawn from a reel 113 mounted on a support 114 which rotates integrally with shaft 106. Clearly, a ribbon 112 shall have to be provided for every rib to be formed. For the sake of simplicity, only duct 111, ribbon 112 and reel 113 associated with groove 109a have been indicated. Given the different melting points of the polyethylene of the pipe and of the polytetrafluoroethylene, the material of the pipe will arrange itself around the insert as depicted in FIG. 3, possibly with an adhesive located in-between.

It is evident that what has been described is provided solely by way of non-limiting example and that variations and modifications are possible without departing from the scope of the invention.

What is claimed is:

1. A duct for a cable of a telecommunications network, said duct comprising at least one tubular element composed of a first plastic and provided along an interior of the tubular element with helical ribs inserted into said interior surface and constituted of preformed ribbons of a plastic material.

2. The duct defined in claim 1 wherein said ribs have bell-shaped cross sections.

3. The duct defined in claim 1 wherein said plastic material is a second plastic of a lower coefficient of friction that said first plastic upon contact with said cable.

4. The duct defined in claim 2 wherein said first plastic is a polyethylene and said second plastic is a polyethylene of a different density than said first plastic or a fluorinated resin.

5. The duct defined in claim 4 wherein said ribs are composed of polytetrafluoroethylene.

6. The duct defined in claim 1 wherein said ribs are formed thereof with areas receiving lubricant adapted to contact said cable.

* * * * *